United States Patent
Bischoff

(10) Patent No.: US 12,367,584 B2
(45) Date of Patent: Jul. 22, 2025

(54) METHOD AND SYSTEM FOR DEFECT DETECTION IN IMAGE DATA OF A TARGET COATING

(71) Applicant: BASF Coatings GmbH

(72) Inventor: Guido Bischoff, Münster (DE)

(73) Assignee: BASF COATINGS GMBH, Muenster (DE)

( * ) Notice: Subject to any disclaimer, the term of this patent is extended or adjusted under 35 U.S.C. 154(b) by 481 days.

(21) Appl. No.: 17/440,062

(22) PCT Filed: Feb. 27, 2020

(86) PCT No.: PCT/EP2020/055186
§ 371 (c)(1),
(2) Date: Sep. 16, 2021

(87) PCT Pub. No.: WO2020/193056
PCT Pub. Date: Oct. 1, 2020

(65) Prior Publication Data
US 2022/0189030 A1  Jun. 16, 2022

(30) Foreign Application Priority Data
Mar. 22, 2019 (EP) .................... 19164671

(51) Int. Cl.
*G06T 7/11* (2017.01)
*G06T 7/00* (2017.01)
(Continued)

(52) U.S. Cl.
CPC ............. *G06T 7/11* (2017.01); *G06T 7/0008* (2013.01); *G06T 7/174* (2017.01); *G06T 7/194* (2017.01);
(Continued)

(58) Field of Classification Search
None
See application file for complete search history.

(56) References Cited

U.S. PATENT DOCUMENTS 6,154,561 A * 11/2000 Pratt ....................... G06T 7/001
348/125
7,162,073 B1 * 1/2007 Akgul ................... G06T 7/0004
356/73.1
(Continued)

FOREIGN PATENT DOCUMENTS

| JP | 2005291844 A | 10/2005 |
|----|--------------|---------|
| JP | 200733236 A  | 2/2007  |

(Continued)

OTHER PUBLICATIONS

Kaichi, Tomoya, et al. "Multi-view surface inspection using a rotating table." Electronic Imaging 2018.9 (2018): 278-1. (Year: 2018).*

(Continued)

*Primary Examiner* — Utpal D Shah
(74) *Attorney, Agent, or Firm* — Armstrong Teasdale LLP

(57) ABSTRACT

Described herein is a computer-implemented method, including: obtaining, using an image capturing device, at least one digital image, each digital image being obtained at a different angle with respect to a surface of a target coating; performing, using an electronic computer processor in an operative connection with at least one filtering unit, a first image analysis on the obtained at least one image to determine at least one bright region within the at least one image by isolating image foreground data from image background data; performing, using the processor, a blob analysis to determine at least one corrupt area within the at least one bright region; and performing additional steps if at least one (Continued)

corrupt area is found. Also described herein are a respective system and a respective computer-readable medium.

14 Claims, 3 Drawing Sheets

(51) Int. Cl.
G06T 7/174 (2017.01)
G06T 7/194 (2017.01)
G06T 7/70 (2017.01)
G06V 10/25 (2022.01)
G06V 10/98 (2022.01)

(52) U.S. Cl.
CPC ............... *G06T 7/70* (2017.01); *G06V 10/25* (2022.01); *G06V 10/993* (2022.01); *G06T 2207/10024* (2013.01); *G06V 2201/07* (2022.01)

(56) References Cited

U.S. PATENT DOCUMENTS

| | | | | |
|---|---|---|---|---|
| 8,189,044 | B2* | 5/2012 | Stier | G01N 21/95 348/92 |
| 9,846,929 | B2* | 12/2017 | Zou | G06T 7/0008 |
| 2004/0091135 | A1* | 5/2004 | Bourg, Jr. | G06T 7/0004 382/110 |
| 2011/0013846 | A1* | 1/2011 | Hori | G06T 7/001 382/218 |
| 2013/0129188 | A1* | 5/2013 | Zhang | G06T 7/0008 382/144 |
| 2014/0242271 | A1* | 8/2014 | Prakash | B60S 5/00 356/73 |
| 2016/0117844 | A1* | 4/2016 | Beymore | G01J 3/463 382/162 |
| 2017/0200288 | A1* | 7/2017 | Beymore | G06T 7/90 |
| 2017/0278235 | A1* | 9/2017 | Zou | G06T 7/0004 |
| 2018/0046877 | A1* | 2/2018 | Chen | G06V 20/40 |
| 2018/0357793 | A1* | 12/2018 | Boes | G01J 3/462 |
| 2019/0043180 | A1* | 2/2019 | Mayer | G06T 5/50 |
| 2019/0172228 | A1* | 6/2019 | Steenhoek | G06T 7/90 |
| 2020/0175352 | A1* | 6/2020 | Cha | G06N 3/04 |
| 2022/0084181 | A1* | 3/2022 | Isken | G16C 60/00 |
| 2023/0221182 | A1* | 7/2023 | Baughman | G01J 3/463 356/402 |

FOREIGN PATENT DOCUMENTS

| | | | |
|---|---|---|---|
| JP | 2010117285 | A | 5/2010 |
| JP | 6482710 | B1 | 2/2019 |

OTHER PUBLICATIONS

Kaichi, Tomoya, "Multi-view surface inspection using a rotating table." Electronic Imaging 2018.9 (2018): 278-1 (Year: 2018).*
International Search Report and Written Opinion for corresponding PCT/EP2020/055186 mailed May 4, 2020, 10 Pages.
Martynenko, "Computer Vision for Real-Time Control in Drying", Apr. 18, 2017 (Apr. 18, 2017), vol. 9, No. 2, pp. 91-111.

* cited by examiner

METHOD AND SYSTEM FOR DEFECT DETECTION IN IMAGE DATA OF A TARGET COATING

CROSS-REFERENCE TO RELATED APPLICATIONS

This application is a U.S. National Phase Application of International Patent Application No. PCT/EP2020/055186, filed Feb. 27, 2020, which claims priority to European Patent Application No. 19164671.0, filed Mar. 22, 2019, the entire contents of which are hereby incorporated by reference herein.

The present invention refers to a method and a system for defect detection in image data of a target coating for a color search and retrieval process.

Today for the color search and retrieval process additional features like e.g. coarseness, sparkle area, sparkle intensity, sparkle grade and/or sparkle color variation/distribution are used as side condition, beside color information, to find an optimal solution for a given target color/target coating. These additional features are metrics for different visual properties of the texture appearance of a color.

These additional features are typically derived from image raw data of the target coating captured by today's photospectrometer instruments like e.g. Xrite MA-T6e, MA-T12® or Byk mac ie. The image raw data are processed by image processing algorithms. As output of those algorithms texture features are gained which are supposed to represent optical properties of the texture of the target coating.

Existing image processing algorithms and its derived texture features are very sensitive against dirt like e.g. finger prints and scratches on the coating's surface, in particular for dark colors and for colors with a small amount of effect pigments/ingredients.

Corrupt texture data in measurements, i.e. images of a target coating violate the color search and retrieval process and lead to incorrect or non-optimal results when searching for a color matching a target color of the target coating.

Thus, a need exists for systems and methods that are suitable for defect detection in image data of a target coating.

SUMMARY OF THE INVENTION

The above-mentioned objects are solved by the system and the method with the features of the respective independent claims. Further embodiments are presented by the following description and the respective dependent claims.

The present disclosure refers to a computer-implemented method, comprising:
- obtaining, using an image capturing device, at least one digital image of a target coating, each digital image being obtained at a different angle with respect to a surface of the target coating;
- performing, using an electronic computer processor in an operative connection with at least one filtering unit, a first image analysis on the obtained at least one digital image to determine at least one bright region within the at least one digital image by isolating image foreground data from image background data;
- performing, using the processor, a blob analysis to determine at least one corrupt area within the at least one bright region; and
- if at least one corrupt area is found,
- masking out the at least one corrupt area for further analysis of the at least one digital image, or
- rejecting the at least one digital image, and/or
- initiate a repetition of the image capturing.

The proposed image processing method allows to detect defects in an image of the target coating. The basic strategy of the proposed method is to (1) find defects in the image by searching for typical structure properties of e.g. finger prints and scratches and to (2) decide to either reject the image or to ignore the detected corrupted/defective areas in the image for further image processing.

DESCRIPTION OF THE INVENTION

Figure 1A:
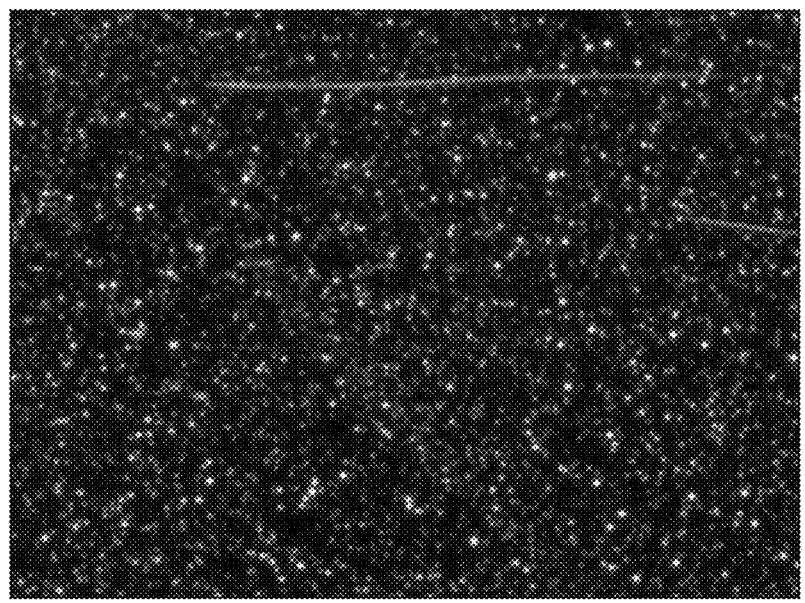
FIG. 1A shows a raw image (a source image) of a surface of a target coating.

According to one embodiment of the proposed method, the proposed method further comprises performing a second image analysis on the at least one masked digital image to determine physical property attributes of the target coating.

Measurements including images with defects can either be rejected or defect/corrupt areas in images can be masked out for a further texture analysis of the respective image. The method can also be configured in the way that the user of the image capturing device gets informed about that the measurement (the obtained at least one digital image) was not valid, e. g. by throwing/outputting a warning message/signal via the computer processor on an output device, such as a display and/or an acoustic output device, the output device being part of the computer processor or being in communication with the computer processor. It can also ask the user to re-measure the coating until the measure data, i. e. the obtained at least one image is valid. It is also possible that the image capturing is automatically repeated by the image capturing device until the obtained at least one digital image is valid, i. e. without detectable defects. Thereby, the image capturing device is automatically informed about the detected at least one corrupt area/defect within the at least one image via a communicative connection between the image capturing device and the electronic computer processor.

Thus, more accurate results and a reduction of errors in the color search and retrieval process can be reached. Further, a reduction of laboratory effort for color development and for customer service matching is gained. The color matching process gets more reliable and faster, accompanied by a cost reduction in operational units.

A communicative connection is to be understood within the scope of the present disclosure as a wired connection, a wireless connection or a combined wired and wireless connection in order to transfer signals/data between respective connected communication partners.

According to one embodiment of the proposed method, the first image analysis is chosen as an image segmentation.

In computer vision, image segmentation is a process of partitioning a digital image into multiple segments. An aim of segmentation is to simplify and/or change a representation of an image into a modified representation of the image that is more meaningful and easier to analyse. Image segmentation is usually used to locate objects and boundaries in images. The result of image segmentation is a set of segments that collectively cover the entire image wherein every pixel in the image is assigned a label such that pixels with the same label share certain properties/characteristics, such as color, intensity and/or texture. Adjacent segments are significantly different with respect to the same properties/characteristics.

According to the proposed method, image segmentation is used to find all bright regions in the raw/source image obtained using the image capturing device. Generally, a dynamic threshold image filter or a high pass filter is applied onto the raw/source image. By use of a high pass filter, the brightest spots/regions amongst the various pixels in the image can be identified. The resultant modified image, i.e. the foreground image data may include information on only the bright regions. The high pass filter may convolve a matrix of values with a high value center point and low value edge points with the matrix intensity information of the image. This isolates high intensity pixels. To further refine the bright regions, an edge detection method of filtering may be applied in conjunction with the intensity filtering.

It is further possible that the bright regions are labeled, thus differentiated from each other. Thus, it might be possible to isolate corrupt areas. The proposed method may result in a number of identified corrupt areas, each meeting criteria based upon individual criteria, such as a comparatively big surface area or a comparatively big aspect ratio.

Typical defects on a coating's texture image are scratches or dirt like e.g. finger prints which lead to corrupt texture feature data. These typical defects have specific properties which should be used to identify the corrupt areas in the image by the proposed image processing method.

Defects caused by finger prints have a much bigger surface area size than typical structures in the texture image like e.g. sparkle points. Based on images captured with the resolution and the field of view of a today's photospectrometer instruments like e.g. Xrite MA-T6®, MA-T12® (480× 360 pixels) or Byk mac i® (640×480 pixels) a typical sparkle point has a size of 1 . . . 25 pixels. Typical defects caused by finger prints have sizes of (much) more than 25 pixels. Therefore, it is proposed that the blob analysis comprises searching in the image foreground data, i. e. in the at least one bright region obtained from the first image analysis for blobs with a big surface area compared to the majority of residual blobs obtained from the image foreground data.

According to a further embodiment, the method further comprises defining a first threshold value and comparing a surface area of each blob obtained from the image foreground data with the first threshold value and identifying a blob as corrupt area when its surface area is equal or greater than the first threshold value. A first threshold value for the blob size could be set to 40 pixels, but it can also be bigger and smaller. The smaller the threshold value the more aggressive the filter acts. A low threshold value of e. g. 25 pixels would lead to the effect that also structures of big sparkles would be identified as defect. For much bigger threshold values the filter would be insensitive for small defects.

Scratches have typically very thin structures. A scratch has the form of a hair. The width of a scratch is typically much longer than its height or its aspect ratio is comparatively big. A typical sparkle point has a symmetric shape. The width is equal (or close) to the height which leads to an aspect ratio of approximately 1. For some sparkle points the width is bigger than the height, e. g. two or three times of the height which leads to an aspect ratio to approximately 2 to 3. Typical defects of scratches have aspect ratios of more than 3. Thus, it is proposed according to a further embodiment of the claimed method that the blob analysis comprises searching in the image foreground data, i.e. in the at least one bright region obtained from the first image analysis for blobs with a big aspect ratio compared to the majority of the residual blobs obtained from the image foreground data.

According to still a further embodiment, the method further comprises defining a second threshold value and comparing an aspect ratio of each blob obtained from the image foreground data with the second threshold value and identifying a blob as corrupt area when its aspect ratio is equal or greater than the second threshold value. The aspect ratio of a geometric shape is the ratio of its sizes in different dimensions. Thus, the aspect ratio of a rectangle is the ratio of its longer side to its shorter side. A second threshold value for the blob aspect ratios could be set to 4, but it can also be bigger and smaller. The smaller the threshold value the more aggressive the filter acts. A low threshold value of e. g. 3 would lead to the effect that also structures of long or thin sparkles would be identified as defect.

In a further embodiment both threshold values could be applied to test if an identified structure is a sparkle point or not. If a surface area of a structure is smaller than the first threshold value AND its aspect ratio is smaller than the second threshold value then it is a sparkle point. Otherwise it is a defect. Generally, besides surface area and aspect ratio, all kind of filter techniques regarding geometric parameters, such as convexity, contour/shape, curvature etc., can be applied.

The proposed method can be used in image processing considering automotive and automotive refinish paints. However, it should be understood that the proposed method and the system disclosed herein apply also to other types of coatings, including industrial coatings. The described embodiments should not be considered limiting. A method consistent with the present disclosure may be practiced in a variety of fields such as the matching and/or coordination of apparel and fashion products.

Embodiments of the invention may be used with or incorporated in a computer system that may be a standalone unit or include one or more remote terminals or devices in communication with a central computer, located, for example in a cloud, via a network such as, for example, the Internet or an intranet. As such, the processor or computer described herein and related components may be a portion of a local computer system or a remote computer or an online system or a combination thereof. The database and software described herein may be stored in computer internal memory or in a non-transistory computer readable medium.

The proposed method and system use an image capturing device which can be, for example, a multi-angle color- or grayscale camera that can produce improved and simplified results for pigment characterization and sample properties.

Traditional light sources that use diffuse or collimated light may be used and an image capturing device, e.g. a color- or grayscale camera with appropriate resolution may be used to collect images at one, some or a plurality of viewing angles.

The present invention also refers to a system comprising:
a database; and a processor programmed for communication with the database, the processor programmed for:

receiving from an image capturing device at least one digital image of a target coating, each digital image being obtained at a different angle with respect to a surface of the target coating;

performing, in operative connection with at least one filtering unit, i.e. filtering technique, a first image analysis on the obtained at least one image to determine at least one bright region within the at least one image by isolating image foreground data from image background data;

performing a blob analysis to determine at least one corrupt area within the at least one bright region; and if at least one corrupt area is found, masking out the at least one corrupt area for further analysis of the at least one image, or rejecting the at least one image and/or initiating a repetition of the image capturing.

According to one embodiment, the system further comprises the processor programmed for performing a second image analysis on the at least one masked image to identify physical property attributes of the target coating.

In still a further embodiment, the system comprises the image capturing device and/or the at least one filtering unit. The image capturing device may be a multi-angle color- or grayscale camera with appropriate resolution. The filtering unit, i.e. the filtering technique may be/use a dynamic threshold image filter or a high pass filter. In case of processing color images it is possible to apply the filtering technique individually to each color channel or to first convert the color image into a grayscale image and to apply the filtering technique to the resulting grayscale image.

According to a further embodiment, the system comprises the processor programmed for searching in the image foreground data, i.e. in the at least one bright region obtained from the first image analysis for blobs with a big surface area compared to the majority of residual blobs obtained from the image foreground data.

The processor may be programmed for defining a first threshold value and comparing a surface area of each blob obtained from the image foreground data with the first threshold value and identifying a blob as corrupt area when its surface area is equal or greater than the first threshold value.

According to another embodiment of the proposed system, the system further comprises the processor programmed for searching in the image foreground data, i.e. in the at least one bright region obtained from the first image analysis for blobs with a big aspect ratio compared to the majority of residual blobs obtained from the image foreground data.

The processor may be programmed for defining a second threshold value and comparing an aspect ratio of each blob obtained from the image foreground data with the second threshold value and identifying a blob as corrupt area when its aspect ratio is equal or greater than the second threshold value.

The present disclosure also refers to a non-transitory computer program product having instructions that are executable by a computer, the computer program product comprising instructions to:

receive from an image capturing device at least one digital image, each digital image being obtained at a different angle with respect to a surface of a target coating;

perform, in operative connection with at least one filtering unit, i.e. at least one filtering technique, a first image analysis on the obtained at least one image to determine at least one bright region within the at least one image by isolating image foreground data from image background data;

perform a blob analysis to determine at least one corrupt area within the at least one bright region; and if at least one corrupt area is found, to mask out the at least one corrupt area for further analysis of the at least one image, or reject the at least one image and/or initiate a repetition of the image capturing.

The invention is further defined in the following examples. It should be understood that these examples, by indicating preferred embodiments of the invention, are given by way of illustration only. From the above discussion and the examples, one skilled in the art can ascertain the essential characteristics of this invention and without departing from the spirit and scope thereof, can make various changes and modifications of the invention to adapt it to various uses and conditions.

FIG. 1A shows an image of a surface of a target coating obtained using an image capturing device, such as a multi-angle color camera with appropriate resolution. The image is obtained at a pre-chosen angle with respect to the surface of the target coating. The image is designated in the following as source image or as raw image.

Figure 1B:
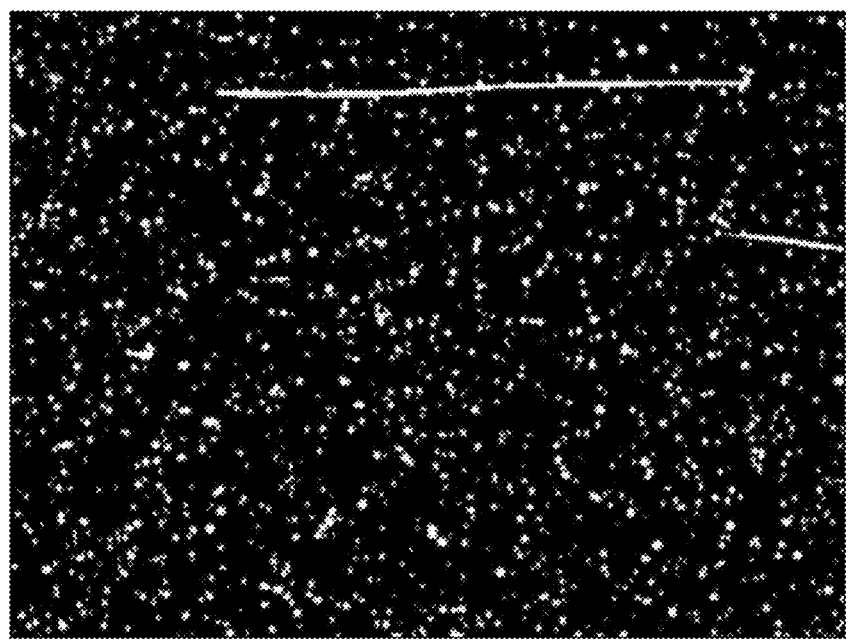
FIG. 1B shows a modified image of the surface of the target coating as result of image segmentation according to one embodiment of the proposed method.

FIG. 1B shows a modified image as result of a first image analysis such as image segmentation. Thereby, the digital source image is partitioned into multiple segments. An aim of segmentation is to simplify and/or change a representation of the image into a modified representation of the image that is more meaningful and easier to analyse. The result of image segmentation is a set of segments that collectively cover the entire image wherein every pixel in the image is assigned to a segment such that pixels within the same segment share certain properties/characteristics, here brightness/intensity. Adjacent segments here are significantly different with respect to brightness. The foreground data are displayed in white color.

According to the proposed method, image segmentation is used to find all bright regions in the raw image. Generally, a dynamic threshold image filter or a high pass filter is applied onto the raw image. By use of a high pass filter, the brightest spots/regions amongst the various pixels in the image can be identified. The resultant image, i.e. the foreground image data as displayed in FIG. 1B may include information on only the bright regions. The high pass filter may convolve a matrix of values with a high value center point and low value edge points with the matrix intensity information of the image. This isolates high intensity pixels. To further refine the bright regions, an edge detection method of filtering may be applied in conjunction with the intensity filtering.

Figure 2:
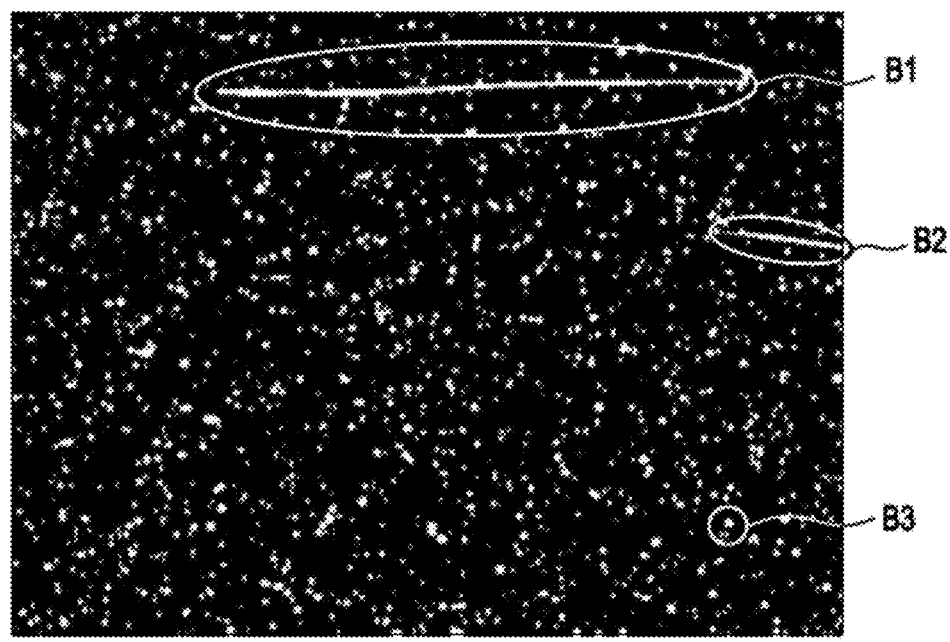
FIG. 2 shows, starting with the modified image of FIG. 1B, a further modified image of the surface of the target coating as result of a blob analysis according to one embodiment of the proposed method.

FIG. 2 shows a result of a blob analysis which had been applied to the modified image of FIG. 1B. The blob analysis had been performed to determine at least one corrupt area among the bright regions which had already been identified/made visible as result of image segmentation.

The blob analysis comprises searching in the image foreground data obtained from the image segmentation for blobs with a big surface area compared to the majority of residual blobs obtained from the image foreground data. Thereby, a first threshold value is defined and a surface area of each blob obtained from the image foreground data is compared with the first threshold value and a blob is identified as corrupt area when its surface area is equal or greater than the first threshold value.

Additionally or alternatively, the blob analysis comprises searching in the image foreground data obtained from the image segmentation for blobs with a big aspect ratio compared to the majority of residual blobs obtained from the image foreground data. Thereby, a second threshold value is defined and an aspect ratio of each blob obtained from the image foreground data is compared with the second threshold value and a blob is identified as corrupt area when its aspect ratio is equal or greater than the second threshold value.

In the example shown in FIG. 2, a first corrupt area/blob B1 has been identified because its surface area as well as its aspect ratio is big with respect to respective surface areas and aspect ratios of the majority of the residual blobs identified in the image foreground data. That means that the surface area of B1 is equal or greater than the first threshold value and the aspect ratio of B1 is equal or greater than the second threshold value. The same applies to a second area/blob B2 which is identified as second corrupt area as its surface area as well as its aspect ratio is also big with respect to respective surface areas and aspect ratios of the majority of the residual blobs identified in the image foreground data. Both, B1 and B2 have the form of scratches.

Blob B3 is a normal blob as its surface area as well as its aspect ratio is smaller than the first and second threshold value, respectively.

Figure 3A:
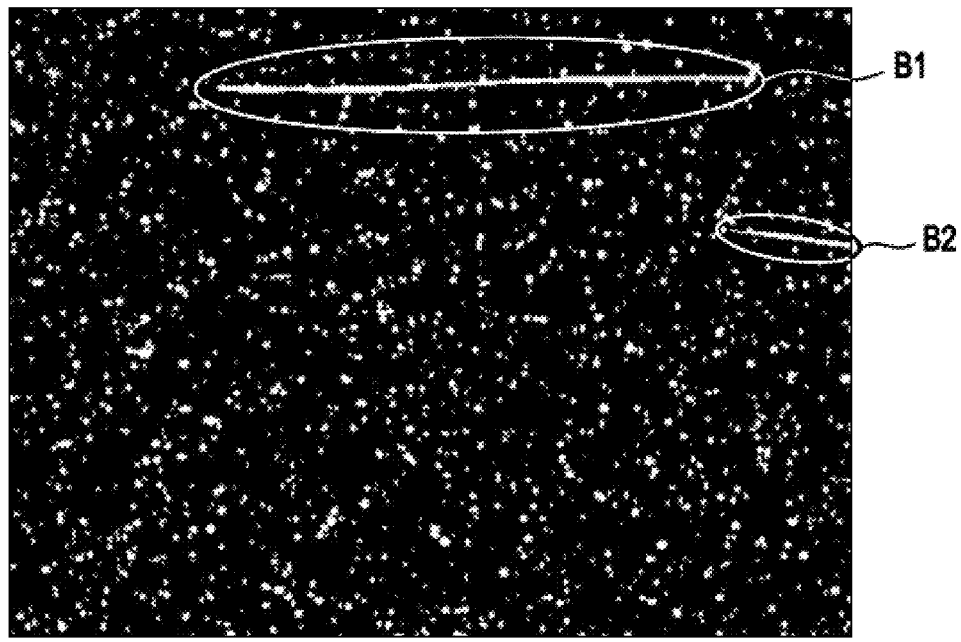
FIG. 3A shows the further modified image of the surface of the target coating of FIG. 2.
Figure 3B:
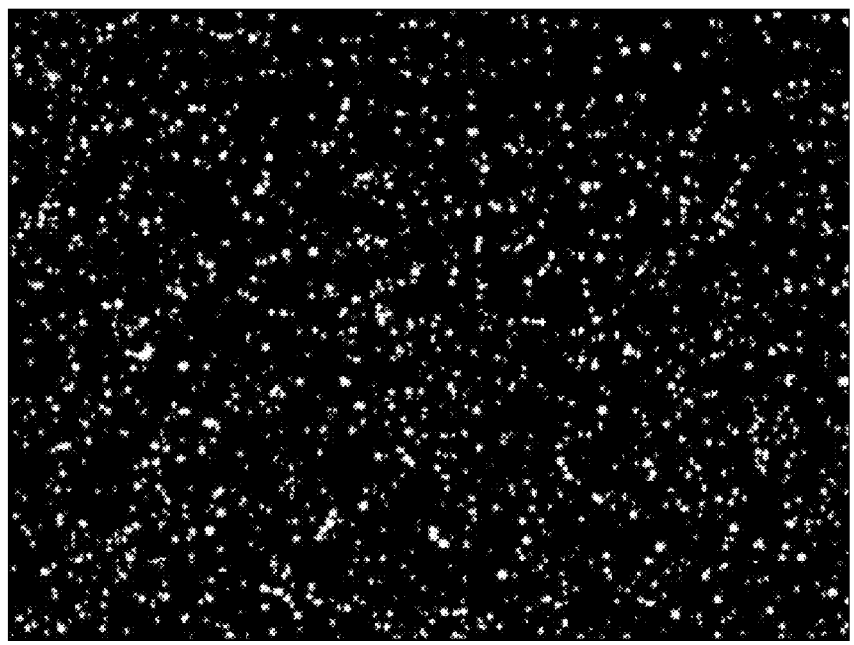
FIG. 3B shows a final image of the surface of the target coating as result of masking out any identified corrupt areas according to one embodiment of the proposed method.

FIG. 3 shows in FIG. 3A the image of FIG. 2. Starting from this image, a further filtering technique is applied resulting in a further modified image in which all identified corrupt areas, namely B1 and B2 are masked out, as shown in FIG. 3B. This further modified image can now be used for further image processing as the corrupt areas, such as scratches are removed. Instead of masking out the identified corrupt areas, the images with corrupt areas can also be rejected and the image capturing can be repeated in order to obtain a new digital image of the target coating.

The invention claimed is:

1. A computer-implemented method, comprising:
    obtaining, using an image capturing device, at least one digital image of a target coating, each digital image being obtained at a different angle with respect to a surface of the target coating;
    performing, using an electronic computer processor in an operative connection with at least one filtering unit, a first image analysis on the obtained at least one digital image to determine at least one bright region within the at least one digital image by isolating image foreground data from image background data; performing, using the processor, a blob analysis to determine at least one corrupt area within the at least one bright region;
    and wherein the blob analysis comprises searching in the image foreground data obtained from the first image analysis for blobs with a big aspect ratio compared to the majority of residual blobs obtained from the image foreground data, wherein a second threshold value is defined and an aspect ratio of each blob obtained from the image foreground data is compared with the second threshold value and a blob is identified as corrupt area when its aspect ratio is equal or greater than the second threshold value, wherein the second threshold value for the blob aspect ratios is set to more than 3; and
    when at least one corrupt area is found,
    masking out the at least one corrupt area for further analysis of the respective digital image, for further image processing as the at least one corrupt area is removed, and alternatively,
    rejecting the respective digital image, and
    initiating a repetition of the image capturing in order to obtain a new digital image of the target coating;
    wherein the first image analysis is chosen as an image segmentation where a high pass filter is applied onto the digital image, wherein the high pass filter is configured to convolve a matrix of values with a high value center point and low value edge points with matrix intensity information of the digital image.

2. The method according to claim 1, further comprising performing a second image analysis on the at least one masked image to identify physical property attributes of the target coating.

3. The method according to claim 1, wherein the blob analysis comprises searching in the image foreground data obtained from the first image analysis for blobs with specific pre-defined geometric properties.

4. The method according to claim 3, wherein the blob analysis comprises searching in the image foreground data obtained from the first image analysis for blobs with a big surface area compared to the majority of residual blobs obtained from the image foreground data, wherein a first threshold value is defined and a surface area of each blob obtained from the image foreground data is compared with the first threshold value and a blob is identified as corrupt area when its surface area is equal or greater than the first threshold value.

5. The method according to claim 1, further comprising issuing a notification about the at least one corrupt area and/or calling on a user of the image capturing device via an output device and/or directly the capturing device via a communicative connection to repeat the image capturing.

6. The method according to claim 1, wherein when at least one corrupt area is found, the method comprises masking out the at least one corrupt area for further analysis of the respective digital image, for further image processing as the at least one corrupt area is removed.

7. A system comprising:
    a database; and
    a processor programmed for communication with the database, the processor programmed for:
    receiving from an image capturing device at least one digital image of a target coating, each digital image being obtained at a different angle with respect to a surface of the target coating;
    performing, in operative connection with at least one filtering unit, a first image analysis on the obtained at least one digital image to determine at least one bright region within the at least one digital image by isolating image foreground data from image background data;
    performing a blob analysis to determine at least one corrupt area within the at least one bright region; and
    wherein the blob analysis comprises searching in the image foreground data obtained from the first image analysis for blobs with a big aspect ratio compared to the majority of residual blobs obtained from the image foreground data, wherein a second threshold value is defined and an aspect ratio of each blob obtained from the image foreground data is compared with the second threshold value and a blob is identified as corrupt area when its aspect ratio is equal or greater than the second threshold value, wherein the second threshold value for the blob aspect ratios is set to more than 3; and
    when at least one corrupt area is found,
    masking out the at least one corrupt area for further analysis of the respective digital image, for further image processing as the at least one corrupt area is rejecting the respective digital image, and initiating a repetition of the image capturing in order to obtain a new digital image of the target coating;

wherein the first image analysis is chosen as an image segmentation where a high pass filter is applied onto the digital image, wherein the high pass filter is configured to convolve a matrix of values with a high value center point and low value edge points with matrix intensity information of the digital image.

8. The system according to claim 7, further comprising an output device, the output device being configured to output a notification about the at least one corrupt area and/or to trigger a repetition of the image capturing in the case that at least one corrupt area is found.

9. The system according to claim 7, further comprising the processor programmed for performing a second image analysis on the at least one masked image to identify physical property attributes of the target coating.

10. The system according to claim 7, further comprising the image capturing device and/or the at least one filtering unit.

11. The system according to claim 7, further comprising the processor programmed for searching in the image foreground data obtained from the first image analysis for blobs with specific pre-defined geometric properties.

12. The system according to claim 11, further comprising the processor programmed for searching in the image foreground data obtained from the first image analysis for blobs with a big surface area compared to the majority of residual blobs obtained from the image foreground data wherein the processor is programmed for defining a first threshold value, storing the first threshold value in the database and comparing a surface area of each blob obtained from the image foreground data with the first threshold value and identifying a blob as corrupt area when its surface area is equal or greater than the first threshold value.

13. The system according to claim 11, further comprising the processor programmed for searching in the image foreground data obtained from the first image analysis for blobs with a big aspect ratio compared to the majority of residual blobs obtained from the image foreground data wherein the processor is programmed for defining a second threshold value, storing the second threshold value in the database and comparing an aspect ratio of each blob obtained from the image foreground data with the second threshold value and identifying a blob as corrupt area when its aspect ratio is equal or greater than the second threshold value.

14. A non-transitory computer program product having instructions that are executable by a computer, the computer program product comprising instructions to:

receive from an image capturing device at least one digital image, each digital image being obtained at a different angle with respect to a surface of a target coating;

perform, in operative connection with at least one filtering unit, a first image analysis on the obtained at least one image to determine at least one bright region within the at least one image by isolating image foreground data from image background data;

perform a blob analysis to determine at least one corrupt area within the at least one bright region; wherein the blob analysis comprises searching in the image foreground data obtained from the first image analysis for blobs with a big aspect ratio compared to the majority of residual blobs obtained from the image foreground data, wherein a second threshold value is defined and an aspect ratio of each blob obtained from the image foreground data is compared with the second threshold value and a blob is identified as corrupt area when its aspect ratio is equal or greater than the second threshold value, wherein the second threshold value for the blob aspect ratios is set to more than 3; and when at least one corrupt area is found, to mask out the at least one corrupt area for further analysis of the respective digital image, for further image processing as the least one corrupt area is removed, and alternatively, reject the respective digital image and initiate a repetition of the image capturing in order to obtain a new digital image of the target coating;

wherein the first image analysis is chosen as an image segmentation where a high pass filter is applied onto the digital image, wherein the high pass filter is configured to convolve a matrix of values with a high value center point and low value edge points with matrix intensity information of the digital image.

* * * * *